United States Patent
Pimouguet et al.

(10) Patent No.: US 8,593,304 B2
(45) Date of Patent: Nov. 26, 2013

(54) INSTALLATION FOR DETECTING AND DISPLAYING THE FAILURES OF THE FUNCTIONAL SYSTEMS OF AN AIRCRAFT

(75) Inventors: Estelle Pimouguet, Fonsorbes (FR); Rémi Cabaret, Toulouse (FR); Nicolas Lambert, Grepiac (FR)

(73) Assignees: Airbus Operations (SAS), Toulouse Cedex (FR); Airbus (SAS), Blagnac Cedex (FR)

( * ) Notice: Subject to any disclaimer, the term of this patent is extended or adjusted under 35 U.S.C. 154(b) by 499 days.

(21) Appl. No.: 12/883,570

(22) Filed: Sep. 16, 2010

(65) Prior Publication Data

US 2011/0063137 A1    Mar. 17, 2011

(30) Foreign Application Priority Data

Sep. 17, 2009 (FR) ...................................... 09 04440

(51) Int. Cl.
    *G01C 21/00* (2006.01)
(52) U.S. Cl.
    USPC .............................. 340/971; 340/945; 701/14
(58) Field of Classification Search
    USPC ......... 340/945, 963, 971, 974, 975, 979, 988, 340/458, 461; 701/3, 7, 14; 324/750.3, 324/760.01

See application file for complete search history.

(56) References Cited

U.S. PATENT DOCUMENTS

| | | | |
|---|---|---|---|
| 6,803,860 B1 * | 10/2004 | Langner et al. | 340/971 |
| 6,946,976 B1 * | 9/2005 | Langner et al. | 340/971 |
| 2006/0184253 A1 * | 8/2006 | Andrews et al. | 700/17 |
| 2007/0222474 A1 * | 9/2007 | de Lauzun | 324/770 |
| 2008/0140269 A1 * | 6/2008 | Naimer et al. | 701/7 |
| 2008/0284618 A1 | 11/2008 | Fabas et al. | |
| 2009/0015437 A1 | 1/2009 | Campagne et al. | |
| 2009/0299554 A1 | 12/2009 | Freissinet | |

\* cited by examiner

*Primary Examiner* — Van T. Trieu
(74) *Attorney, Agent, or Firm* — Novak Druce Connolly Bove + Quigg LLP

(57) ABSTRACT

An installation for detecting and displaying the failures of the functional systems of an aircraft is described. The installation can include both a general alarm system (4) connected to said functional systems (2) and to the auxiliary alarm detection means (5) originated from said functional systems, and a complementary alarm system (6), connected to said functional systems (2), independently from the general system (4), and able to indicate a breakdown not detected by the general system on the instrument panel of the cockpit.

1 Claim, 2 Drawing Sheets

INSTALLATION FOR DETECTING AND DISPLAYING THE FAILURES OF THE FUNCTIONAL SYSTEMS OF AN AIRCRAFT

CROSS-REFERENCE TO RELATED APPLICATIONS

This application claims priority to French Application No. 09 04440, which was filed Sep. 17, 2009, the entirety of which is incorporated by reference herein.

FIELD OF THE INVENTION

The present invention relates to an installation for detecting and displaying breakdowns of the functional systems (or auxiliary units) of an aircraft in the cockpit thereof.

BACKGROUND

As known, civil or military modern airplanes are provided, for safety reasons, with such an installation for detecting and displaying breakdowns, while allowing to monitor the operation of the functional systems of the airplane related, for example, to hydraulics, air management, pressure in the cockpit, fuel, landing gear, electricity, etc., and to warn the pilot(s) should a functional system dysfunction occurs.

An installation of such a type mainly comprises:

an general alarm system (referred to in the aeronautic field as FWS for Flight Warning System), connected to said functional systems and able to indicate the breakdowns detected on at least one display screen located substantially in front of the pilot, on the instrument panel of the cockpit; and auxiliary alarm detection means directly originated from said functional systems, independently from said general system, and able to indicate said breakdowns being detected to warning elements located at least in part at the level of the ceiling of said cockpit, substantially above said pilot.

In such an installation, the general alarm system centralizes and monitors the set of information (parameters, etc.) transmitted by the functional systems of the airplane and indicates, on the display screen of the instrument panel, the alarms should a breakdown of a functional system of the airplane be detected. Thus, when such a breakdown is shown, the general system FWS displays on the display screen, in the form of a page, the procedure that the crew should implement in order to process the breakdown being detected and limit, or even delete, the effects thereof. The general system FWS further communicates to the display screen the page(s) relating to the defective functional system, being displayed in parallel to that relating to the alarm. Such information allows the crew to better seize the breakdown and the associated procedure for solving it.

Any information on the operation of such functional systems is thus centralized on the display screen, in front of the pilot's or pilots' eyes.

The auxiliary alarm detection means are another source of information on the operation of the functional systems of the airplane, being independent from the general system FWS, allowing to improve the coverage of alarms and thus safety, and to prevent the non-detection of a breakdown by the general alarm system. This relates, in particular, to the most critical breakdowns such as a fire, etc. The warning elements, such as warning lights, indicators, or others, of the auxiliary means originated from the functional systems, are located at the ceiling of the cockpit, as well as on screens of the instrument panel, for example, on the synopses of the system pages, and indicates, with a light and/or sound, the breakdowns being detected.

Thus, these are detected and indicated both by the general system FWS and by the auxiliary detection means.

Furthermore, it is known that, during night tactical operations (low altitude flight, dropping on flight, etc.), pilots of military airplanes use night vision binoculars. Thus, when they are bearing such binoculars, the vision field of the pilots becomes reduced and is limited to the instrument panel of the cockpit and to the external vision, through the windscreen. Thereby, the ceiling of the cockpit and the different warning elements it comprises, are no longer visible directly to the pilot(s). Thus, they have not any longer a direct vision of the warning elements of the independent auxiliary detection means. Consequently, when the general system does not detect a breakdown of a functional system of the airplane, so that nothing is displayed on the display screen of the instrument panel, the crew bearing the night vision binoculars does not see the then active warning elements located at the ceiling and thus risks not to be informed about the breakdown and not to apply the associated procedure.

Such a problem can also occur during the day in specific military phases such as dropping, for example, when the crew has a very large workload or is already facing a technical dysfunction, so that they forget to look at the <<ceiling>> indicators.

SUMMARY OF THE INVENTION

The present invention aims at solving such drawbacks and relates to an installation for detecting and displaying breakdowns of the functional systems of an aircraft, being designed such that the crew can be warned of a breakdown not detected by the general alarm system, even if the crew is wearing night vision binoculars.

To this end, the installation of the previously specified type is remarkable, according to this invention, in that it further comprises a complementary alarm system, related to said functional systems independently from said general system, and adapted to detect and indicate on said instrument panel of said cockpit, at least one breakdown not correctly detected by said general system.

Thus, thanks to this invention, the complementary alarm system provides the monitoring function of the functional systems of the aircraft similarly to the general system, and is substituted to the latter when the general system has not noticed, for one reason or another, a breakdown or a dysfunction of a functional system of the aircraft and the latter is thus not displayed on the instrument panel. Thereby, the pilot will be thus warned about the breakdown by an indication (piece of information) being displayed on the instrument panel of the cockpit, i.e. substantially in front of his eyes and this, even if the pilot is bearing night vision binoculars preventing him to see the ceiling of the cockpit while concealing the latter, whereas the warning element of the auxiliary detection means is active, having detected the breakdown.

Such a complementary alarm system is a <<redundancy>> of the general alarm system, but only interferes when the general alarm system FWS does not detect a breakdown and the parameters of the functional systems of the aircraft indicate an abnormal behaviour of one of them. The monitoring function of the complementary system thus confirms that an alarm should have been triggered by the general system FWS, and displays the breakdown on the instrument panel.

Advantageously, the indication of the breakdowns by said complementary system, when these are not detected by said general alarm system, is displayed on said display screen of the instrument panel, serving for said general alarm system.

Thus, one single screen is used by both systems (general and complementary) limiting the costs and the congestion and not disturbing the pilot directing usually his eyes to the same screen.

Preferably, said breakdown indication comprises displaying, on said display screen, an alarm message indicating the non detection of an alarm by said general system and the page relative to the functional system associated to the breakdown not detected by said general system.

BRIEF DESCRIPTION OF THE DRAWINGS

The figures of the appended drawing will better explain how this invention can be implemented. In these figures, like reference numerals relate to like components

DETAILED DESCRIPTION

Figure 1:
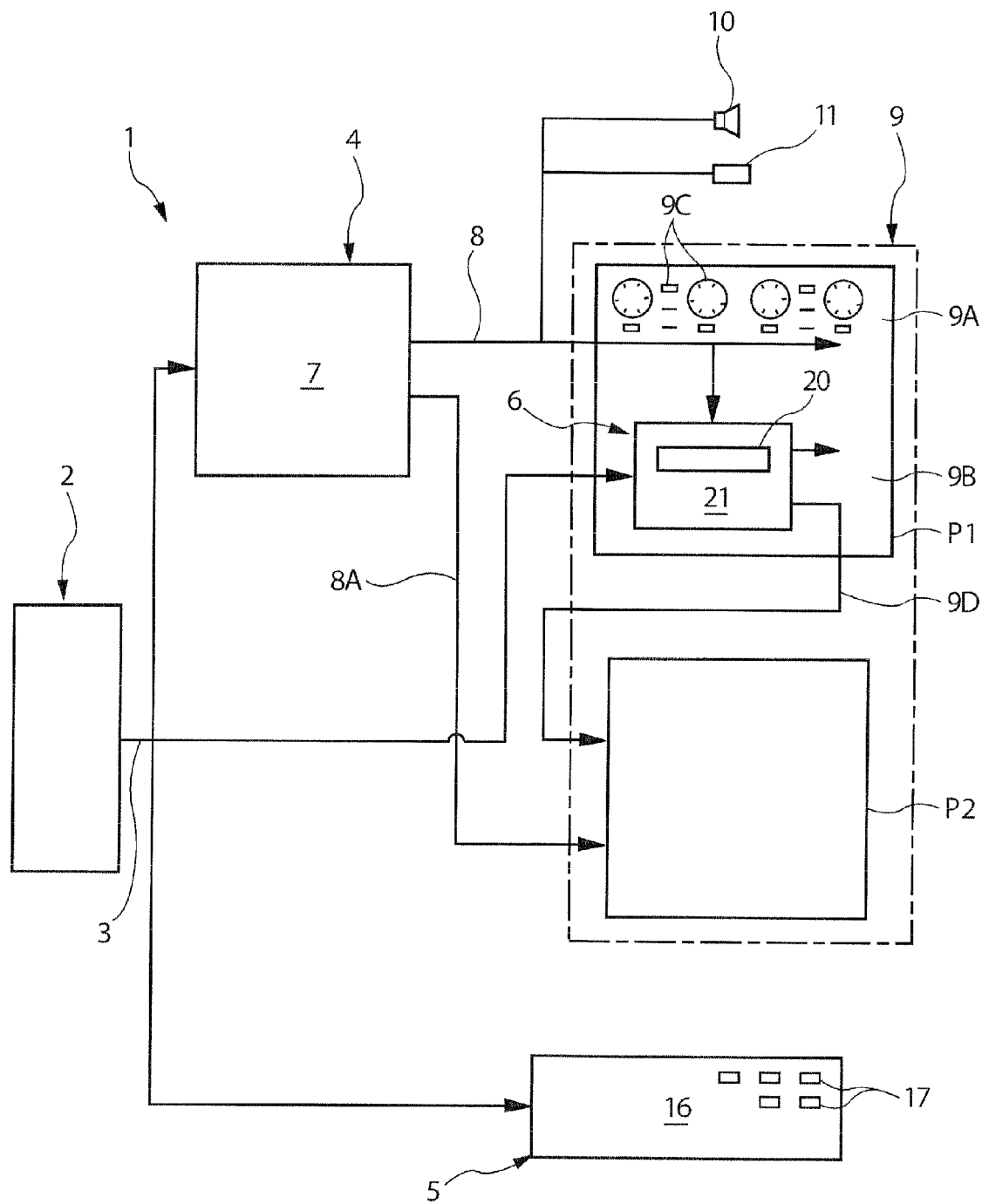
FIG. 1 is a schematic block diagram of an installation for detecting and displaying breakdowns of the functional systems of an aircraft, according to this invention.

The installation 1 shown on FIG. 1 aims at detecting and displaying the breakdowns able to occur on board an airplane on the functional systems 2 thereof, so that the pilot(s) being informed about such breakdowns, appropriately react in order to process them.

As has been previously reminded, the functional systems 2 generally refer to the electrical, fluidic (hydraulics, air, pressurisation, fuel, etc.) systems of the airplane to be used for its operation, but, of course, they could also refer to other types of systems without departing from this invention. Such functional systems 2 deliver at the outlet thereof information originated from measurement elements (sensors, detectors, etc.) of said systems 2 and relating to parameters of the operation thereof, and such information are sent to the installation 1 via an overall link 3 coming out of the systems 2 on FIG. 1.

Such an installation 1 comprises, as known, a general alarm system 4 (Flight Warning System) and auxiliary alarm detection means 5 and, according to this invention, a complementary alarm system 6, the systems and the means 4, 5 and 6 being each connected to the overall link 3.

In particular, the general system FWS 4 for monitoring the set of the functional systems of the airplane manages and centralizes the detection of the breakdowns and is symbolized by a rectangle 7 wherein the heart of the system is located (calculator, etc.). It receives, on one side, the information of the parameters of the functional systems 2 of the airplane via the link 3 and delivers, on the other side, via a link 8, information relating to the display of the alarms emitted as a result of the breakdowns being detected and the procedures for solving it, and, via a link 8A, the information relating to the automatic display of the page of the functional system 2 associated with the breakdown. The display of such alarms occurs more particularly via a display screen 9 (of the system FWS) and, also, by warning elements such as the schematized loud-speaker 10 and the warning light 11.

Figure 2:
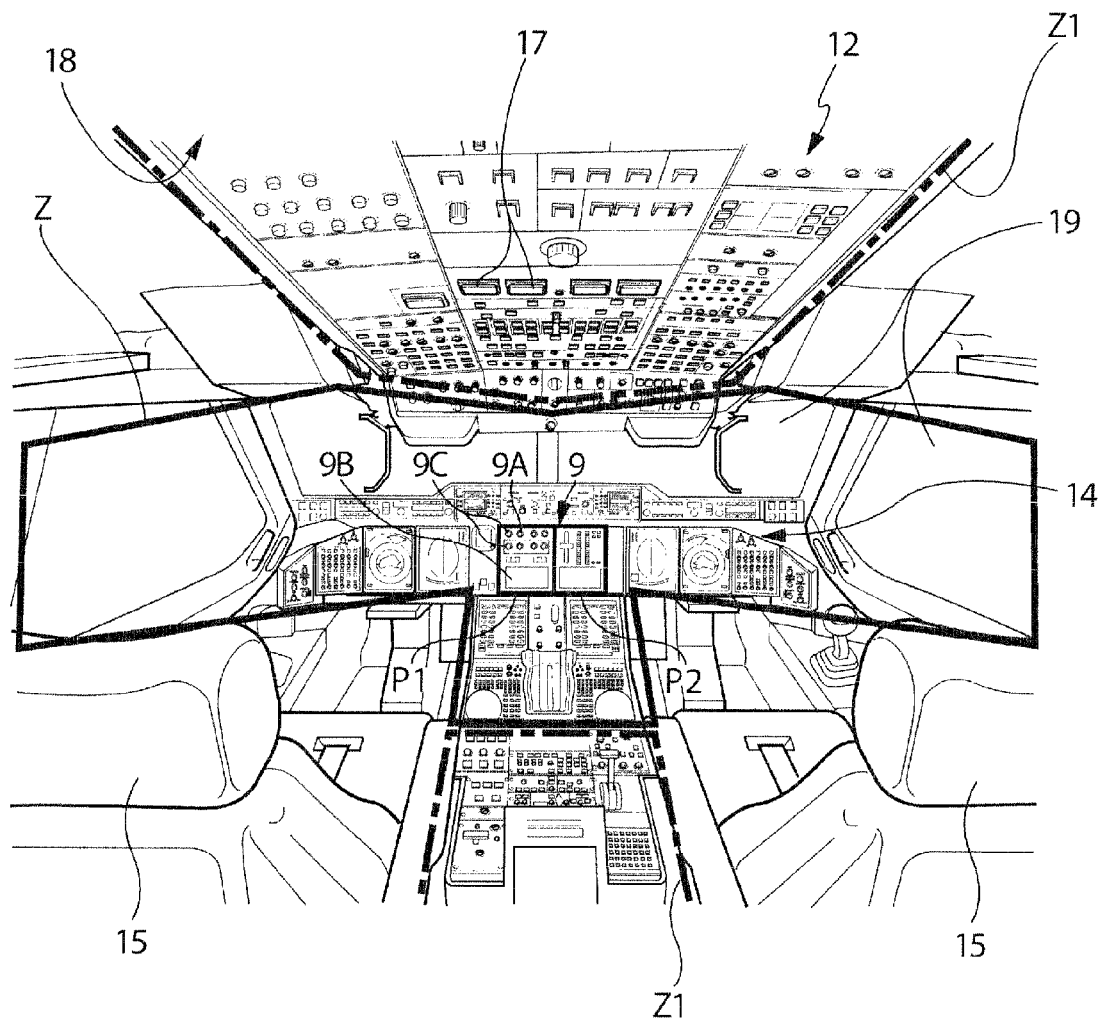
FIG. 2 is a schematic perspective view of a cockpit on which there are displayed the breakdowns detected by said installation.

Whatever the types of displaying of such alarms, these occur on the cockpit 12 of the airplane, as shown on FIG. 2, including on the instrument panel 14 of the cockpit. There is more particularly shown the concerned display screen 9 by the system FWS being located at the middle of the instrument panel 14, i.e. in front of both seats 15 of the pilot and the co-pilot for instance. Such a display screen 9 is for instance that allowing in the upper part 9A to read, on the indicators 9C (digital and analogical dials), engine parameters (speed, thrust, temperature of the exhaust gases, etc.), whereas the lower part 9B is dedicated to the display of page P1 of the alarms being necessary should a breakdown be detected of one of the functional systems 2 via the link 8. On the lower part of such a page of the display screen 9 there are also displayed the procedures to be implemented by the crew in order to limit the effects of the breakdown being detected. Furthermore, the general system FWS 4 further communicates to the display screen 9 and via a link 8A, the page P2 of the concerned functional system amongst the set of the system pages being stored. Such a page P2 is then displayed in parallel with P1 displaying the alarm. Thus, as FIG. 2 shows, both pages P1, P2 of the display screen 9 are located side by side in the middle of the instrument panel 14 of the cockpit 12. It is thus understood that such an arrangement of the display screen in front of the eyes of the pilots allows for an immediate detection of the alarms. For representation sake, both pages P1, P2 of the display screen 9 are arranged on top of the other on FIG. 1.

The auxiliary alarm detection means 5, as has been previously indicated, are independent from the general alarm system 4 and are a parallel and distinct information way on the possible breakdowns of the functional systems 2. Such auxiliary means 5, symbolized by a rectangle 16 on FIG. 1, are directly originated from the functional systems 2 (sensors and similar) via the link 3 transmitting the information of various parameters of the functional systems and they comprise warning elements 17, some of which are illustrated in the rectangle 16 and that could be warning lights, indicators, etc., arranged on the ceiling 18 and on the instrument panel 14 of the cockpit 12 (FIG. 2). The functional systems 2 thus directly activate the different warning elements 17 of the auxiliary means 5, without using the general alarm system FWS 4.

Figure 3:
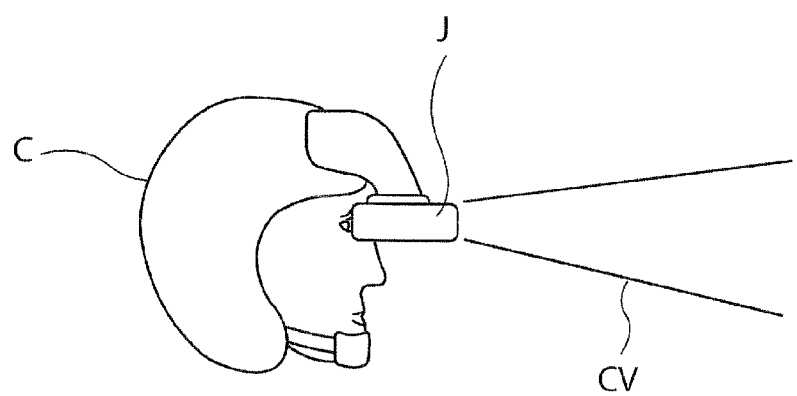
FIG. 3 represents a pilot of said aircraft provided with night vision binoculars.

As a reminder, the complementary alarm system 6 of this invention aims at detecting a breakdown that the general alarm system FWS would not have detected, and at informing the pilot of the latter, in particular when he is bearing, on his helmet C, night vision binoculars J arranged in front of his eyes, as shown on FIG. 3.

Indeed, with such night vision binoculars J, the vision field CV of the pilots in the cockpit 12 becomes particularly reduced and is limited, on FIG. 2, by the area Z (highlighted solid line) defined by the main instrument panel 14, including the display screen 9 of the general alarm system 4, and the external vision through the windscreen 19. Thereby, the set of the ceiling panel 18 is no longer in the direct vision field CV of the pilots and is located in a non visible area Z1 (highlighted mixed line), as they thus no longer see the warning elements 17 of the auxiliary alarm means 5 able to indicate an alarm.

The complementary alarm system 6, being connected via the link 3 to the information delivered by the functional systems 2, enables to indicate on the display screen 9 of the instrument panel 14, the breakdown that is not detected by the general alarm system 4. Thus, even if the pilots are wearing night vision binoculars J and the general alarm system 4 does not indicate any breakdown of one of the functional systems 2 of the airplane, the pilots are informed about the alarm by the complementary system 6. Indeed, the latter displays a message 20 in the lower part 9B of the page P1 of the display screen 9, being arranged in the vision field of the pilots bearing the binoculars. i.e. in the visible area Z. To this end, the display screen 9 integrates the monitoring function of the complementary system 6, symbolized by the rectangular display device 21, receiving the information coming from the links 3 and 8 and wherein the alarm message 20 can be shown. In order to limit the cost of such a complementary system 6, monitoring the breakdowns is limited to the most critical alarms, i.e. those requiring the crew to quickly react.

Such a complementary monitoring function provided by the system 6 is then inactive when an alarm is correctly detected by the general system FWS 4, the displaying device receiving the corresponding information from the links 3 and 8. On the contrary, when the latter does not detect any breakdown of a functional system via the link 8, but the parameters received via the link 3 indicate an abnormal behaviour of a functional system, the monitoring function of the complementary system 6 becomes active and confirms that an alarm should have been detected. That triggers then the display of the warning message 20 on the display screen 9 for informing the crew of the non detection of the breakdown by the general alarm system 4. Simultaneously, the monitoring function of the complementary system 6 displays, via a link 9D, the page P2 relating to the functional system associated with the breakdown not detected on the display screen on as to improve the detection by the pilots.

Thus, thanks to the message displayed on the page P1 of the lower part 9B of the display screen 9 as well as the page P2 of the system going up in the other part of the screen, when the general alarm system 4 does not detect a breakdown, the pilots of the airplane, even when they are provided with night vision binoculars J, are warned about the breakdown of the concerned airplane system 2 while observing the display screen 9 arranged in front of them and also looking up toward the warning elements 17 of the auxiliary means 5 arranged on the ceiling 18.

The invention claimed is:

1. An installation for detecting and displaying the breakdowns of the functional systems (2) of an aircraft, comprising:
  a general alarm system (4), connected to said functional systems (2) and able to indicate said breakdowns detected on at least one display screen (9) located substantially in front of the pilot, on the instrument panel of the cockpit; and
  auxiliary alarm detection means (5) directly originated from said functional systems (2), independently from said general system, and able to indicate said detected breakdowns to warning elements (17) arranged at least in part at the level of the ceiling of said cockpit, above said pilot, and
  a complementary alarm system (6), connected to said functional systems (2) independently from said general system (4), and adapted for detecting and indicating on said instrument panel of said cockpit, at least one breakdown not correctly detected by said general system,
  wherein the indication of the breakdowns detected by said complementary system (6), when they are not detected by said general system (4), is displayed on said display screen (9) dedicated to said general alarm system,
  wherein said breakdown indication comprises displaying, on said display screen, an alarm message (20) indicating the non-detection of an alarm by said general system and the page relating to the functional system associated with the breakdown not detected by said general system, and
  wherein the alarm message is displayed in a lower part of the display screen arranged in the vision field of a pilot wearing binoculars.

* * * * *